US008762893B2

(12) United States Patent
Miller et al.

(10) Patent No.: US 8,762,893 B2
(45) Date of Patent: Jun. 24, 2014

(54) AUTOMATIC DERIVATION OF ANALOGOUS TOUCH GESTURES FROM A USER-DEFINED GESTURE

(75) Inventors: James B. Miller, Sunnyvale, CA (US); Jean-Michel Trivi, Boulder Creek, CA (US)

(73) Assignee: Google Inc., Mountain View, CA (US)

( * ) Notice: Subject to any disclaimer, the term of this patent is extended or adjusted under 35 U.S.C. 154(b) by 3 days.

(21) Appl. No.: 12/780,632

(22) Filed: May 14, 2010

(65) Prior Publication Data

US 2011/0279384 A1  Nov. 17, 2011

(51) Int. Cl.
*G06F 3/033* (2013.01)
*G06F 3/041* (2006.01)
*G06F 3/0488* (2013.01)
*G06F 3/01* (2006.01)

(52) U.S. Cl.
CPC .............. *G06F 3/0488* (2013.01); *G06F 3/017* (2013.01); *G06F 3/04883* (2013.01); *G06F 3/04886* (2013.01)
USPC .......................................... 715/863; 345/173

(58) Field of Classification Search
USPC .................. 715/702, 727, 863, 864; 345/173
See application file for complete search history.

(56) References Cited

U.S. PATENT DOCUMENTS

| 5,543,590 A | 8/1996 | Gillespie et al. |
| 2008/0104547 A1 | 5/2008 | Morita et al. |
| 2008/0165255 A1 | 7/2008 | Christie et al. |
| 2009/0051648 A1 | 2/2009 | Shamaie et al. |
| 2009/0273579 A1 | 11/2009 | Zachut et al. |
| 2010/0328224 A1* | 12/2010 | Kerr et al. ............. 715/863 |

OTHER PUBLICATIONS

International Search Report and Written Opinion for International Application No. PCT/US2011/036312, European Patent Office, Rijswijk, Netherlands, mailed on Aug. 9, 2011.
iPhone User Guide for iPhone and iPhone 3G, Apple Inc., 2008, 154 pages.

* cited by examiner

*Primary Examiner* — Haoshian Shih
(74) *Attorney, Agent, or Firm* — Troutman Sanders LLP; James E. Schutz; Scott D. Barnett

(57) ABSTRACT

Embodiments enable a mobile device to execute an action analogous to a user-defined action in response to receipt of a gesture analogous to a user-defined gesture. In an embodiment, a method automatically interprets touch gestures on a mobile device. In the method, a user input is received that defines a first touch gesture to initiate a first action on an application of the mobile device. A second touch gesture is received on a touch screen of the mobile device. The second touch gesture is similar, but not identical, to the first touch gesture, and has a different orientation, size or position from the first touch gesture. In response to receipt of the second touch gesture, a second action is determined on the application of the mobile device according to a difference between the first and second touch gestures in orientation, size or position on the screen of the mobile device. Finally, the second action is initiated.

17 Claims, 4 Drawing Sheets

AUTOMATIC DERIVATION OF ANALOGOUS TOUCH GESTURES FROM A USER-DEFINED GESTURE

BACKGROUND

1. Field of the Invention

This field relates to touch gestures on a mobile device.

2. Related Art

Some mobile devices, such as cell phones, personal digital assistants (PDAs), portable navigation devices (PNDs) and handheld game consoles, include touch screens. These devices accept input by detecting movements of fingers or other objects in contact with their touch screen. These movements are known as touch gestures. Upon detection of a touch gesture, the mobile device, or an application stored thereon, may execute an action. For example, upon detection of a pinch touch gesture, a web browsing application may zoom into a web page.

Some mobile applications execute analogous actions in response to analogous touch gestures. For example, the web browsing application in the IPHONE mobile device, available from Apple, Inc., zooms out of a web page when a user pinches her fingers together and zooms into a web page when a user moves her fingers apart. However, these gestures cannot generally be configured by a user.

Mobile devices generally include lock screens to prevent unauthorized or unintentional access to the device. Mobile devices running the ANDROID operating system, available from Google Inc., enable a user to define a touch pattern gesture to unlock a touch screen. This feature, known as pattern unlock, enables a user to define a gesture for authentication purposes.

Systems and methods are needed that enable users to define more easily a broader range of touch gestures.

BRIEF SUMMARY

Embodiments enable a mobile device to execute an action analogous to a user-defined action in response to receipt of a gesture analogous to a user-defined gesture. In a first embodiment, a computer-implemented method automatically interprets touch gestures on a mobile device. In the method, a user input is received that defines a first touch gesture to initiate a first action on an application of the mobile device. A second touch gesture is received on a touch screen of the mobile device. The second touch gesture is similar, but not identical, to the first touch gesture, and has a different orientation, size or position on the touch screen of the mobile device from the first touch gesture. In response to receipt of the second touch gesture, a second action, different from but related to the first action, is determined on the application of the mobile device according to a difference between the first and second touch gestures in orientation, size or position on the screen of the mobile device. Also in response to receipt of the second touch gesture, the second action on the application of the mobile device is initiated.

In a first embodiment, a system automatically interprets touch gestures on a mobile device. The system includes a gesture definition module that receives a user input to define a first touch gesture to initiate a first action on an application of the mobile device. A touch receiver receives a second touch gesture on a touch screen of the mobile device. The second touch gesture is similar, but not identical, to the first touch gesture, and has a different orientation, size or position on the touch screen of the mobile device from the first touch gesture. Finally, the system includes a gesture interpretation module that, in response to receipt of the touch gesture, determines a second action, different from, but related to, the first action, on the application of the mobile device. The gesture interpretation module determines a second action according to a difference between the first and second touch gestures in orientation, size or position on the screen of the mobile device. The gesture interpretation module also initiates the second action on the application of the mobile device.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments enable a mobile device to execute an action analogous to a user-defined action in response to receipt of a gesture analogous to the user-defined gesture. In an embodiment, a user may define a gesture to execute a particular action. Some actions, such as changing mobile device's volume, involve a magnitude value. Other actions, such as pausing or resuming music playback, are opposite of each other. In an embodiment where the particular action involves a magnitude, the mobile device may recognize touch gestures that are similar to the user-defined gesture, but have a different size or position on the touch screen. According to the difference in size or position, the mobile device may execute the action with a different magnitude.

Figure 1:
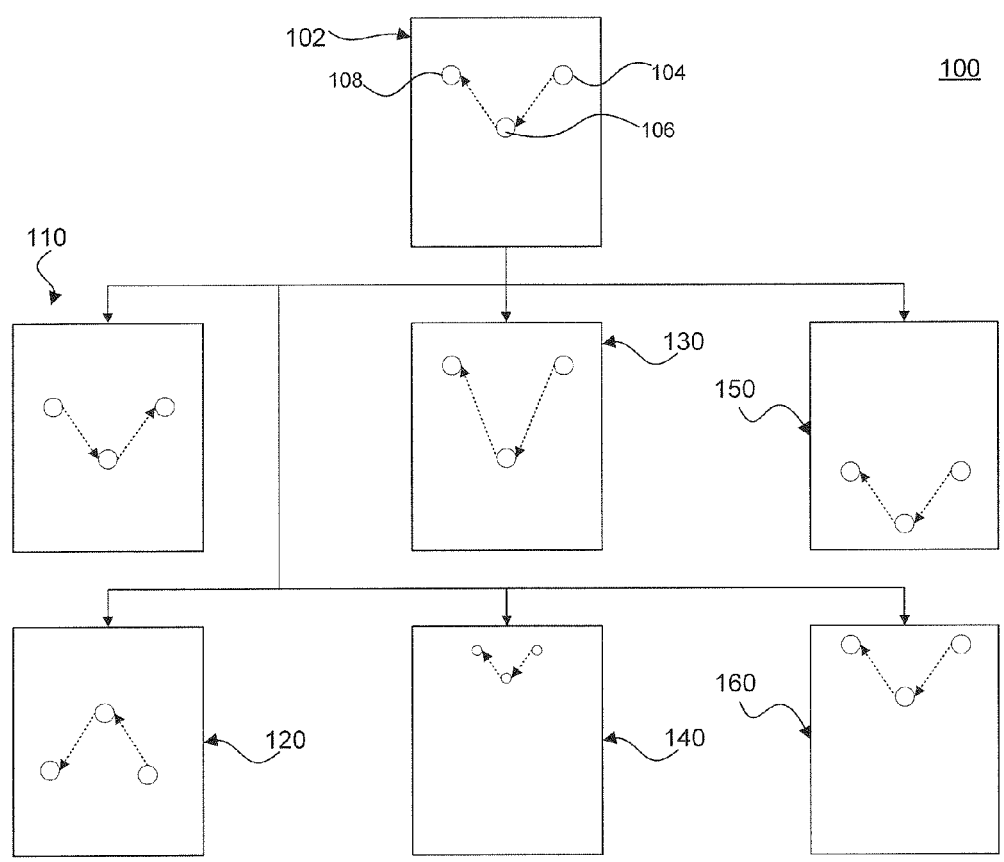
FIG. 1 is a diagram illustrating different types of automatically derived touch gestures, according to an embodiment.

FIG. 1 shows a diagram 100 illustrating different types of automatically derived touch gestures, according to an embodiment. Diagram 100 includes a touch screen 102 illustrating the user-defined gesture. For example, a mobile device may provide an interface that prompts the user to define a touch gesture for a particular action, such as changing the mobile device's volume.

Touch screen 102 illustrates a user-defined gesture where the user first touches her finger at a position 104, moves her finger to a position 106 and then moves her finger to a position 108. In this way, the gesture forms a right-to-left "v" pattern where the user moves her finger down and up. In an example, a user's finger may stay in contact with the touch screen until it reaches position 108. When the user's finger is no longer in contact with touch screen 102, the gesture may complete. Once the user defines the gesture in touch screen 102, the mobile device may execute the corresponding action when the device detects the defined gesture on the touch screen. In addition to executing the particular action corresponding to the user-defined gestures, the mobile device may execute analogous actions when the device detects analogous gestures as illustrated in touch screens 110, 120, 130, 140, 150, and 160.

As illustrated in touch screens 110 and 120, the mobile device may execute actions upon receipt of gestures that have a different direction from the user-defined gesture in touch screen 102. The gesture shown touch screen 110 has been flipped along the x-axis. In this case, flipping the gesture along the x-axis has the effect of changing the direction of movement from right-to-left to left-to-right. The gesture shown touch screen 120 has been flipped along the y-axis. In this case, flipping the gesture along the y-axis has the effect of changing the direction of movement from down-and-up to up-and-down. In an example where the gesture rounded (e.g., circular), flipping the gesture along an axis may have the effect of changing a clockwise gesture into a counter-clockwise gesture, or vice versa. Further, in an embodiment, the received touch gesture may have a different orientation. For example, the gesture may be rotated by, for example, 180 degrees.

Detecting a gesture that differs from the user-defined gesture in direction may cause the mobile device to initiate a complementary or opposite action. For example, if the user defined the gesture in touch screen 102 to mute the mobile device, receipt of the gestures in touch screens 110 or 120 may unmute the mobile device. In another example, if the user-defined gesture is to pause music playback, receipt of the gestures in touch screens 110 or 120 may resume music playback.

In addition to differing in direction, the mobile device may execute actions upon receipt of gestures that differ in size from the user-defined gesture in touch screen 102, as illustrated in touch screens 130 and 140. The gesture in touch screen 130 is larger than the user-defined gesture, and the gesture in touch screen 140 is smaller than the user-defined gesture.

Similar to the differing in size, the mobile device also may execute actions upon receipt of gestures that differ in position from the user-defined gesture in touch screen 102, as illustrated in touch screens 150 and 160. The gesture in touch screen 130 is lower along the y-axis than the user-defined gesture, and the gesture in touch screen 140 is higher along the y-axis than the user-defined gesture.

Upon receipt of the gestures in touch screens 130, 140, 150, or 160, a mobile device may execute an action that is similar to the predefined action but differs in a magnitude or other variable. The variable may be determined by determining a difference in size or position between the received touch gesture and the pre-defined touch gesture. For example, the pre-defined touch gesture may define a change in volume. In that example, the gesture in touch screen 130 is smaller than the pre-defined gesture. Therefore, in response to receipt of the gesture in touch screen 130, the mobile device may lower the volume. The gesture in touch screen 140 is larger than the pre-defined gesture. Therefore, in response to receipt of the gesture in touch screen 140, the mobile device may increase the volume.

Receiving gestures at different positions on the touch screen may operate in a similar manner. For example, the gesture in touch screen 160 is lower than the pre-defined gesture. Therefore, in response to receipt of the gesture in touch screen 160, the mobile device may lower the volume. The gesture in touch screen 150 is larger than the pre-defined gesture. Therefore, in response to receipt of the gesture in touch screen 140, the mobile device may increase the volume. In this way, once the user defines a single action, the mobile device can accept a wide range of additional inputs.

In other examples, the gestures of touch screens 130, 140, 150, and 160 may be used in other actions that involve a magnitude or other variable. For example, the gestures may seek in a media track, such as a music track. In that example, the relative position and size may affect whether the mobile device seeks forward or backward and by how much to seek.

In different embodiments, aspects of the different touch gestures shown in diagram 100 may be combined. A gesture may differ from the pre-defined gesture in two or more of direction, position, and size. The various differences can affect the executed action in different ways. For example, a gesture that differs from the pre-defined gesture in both direction and size may cause an opposite action to execute using a variable determined based on the difference in size. In this way, many permutations of available actions become available from a single user-defined touch gesture.

Figure 2:
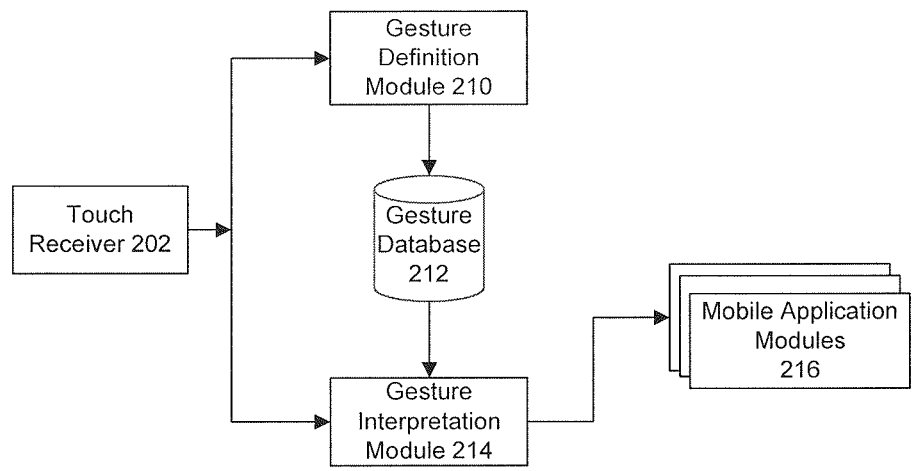
FIG. 2 is a diagram illustrating a system for automatically deriving touch gestures for related actions, according to an embodiment.

FIG. 2 is a system diagram illustrating a mobile device 200 for automatically deriving touch gestures for related actions, according to an embodiment. Mobile device 200 includes a touch receiver 202, a gesture definition module 210, a gesture database 212, and a gesture interpretation module 214.

In an example operation, a user may define a touch gesture associated with an action in mobile application modules 216 using gesture definition module 210. To define the touch gesture, the user may be prompted to enter the touch gesture on touch receiver 202. Then, gesture definition module 210 may store data specifying the user-defined gesture and an identification of the associated action in gesture database 212. Once the user-defined gesture is created, a user may input a variation of the gesture, having a different direction, size, or position, on touch receiver 202. Gesture interpretation module 214 may recognize that the user has input a variation of the user-defined gesture by comparing the inputted gesture data with the data stored in gesture database 212. In response to the recognition, mobile device 200 may execute an action in mobile application modules 216 similar to the action associated with the pre-defined gesture. Each component and its operation are described in greater detail below.

Touch receiver 202 may be any type of touch receiver that accepts input from a touch screen. In an example, touch receiver 202 may receive touch input on a view (not shown) of mobile device 200. The touch input received may include a position that the user touched as defined by an X and Y coordinate on the screen. The user may touch the screen with a finger, stylus, or other object. Touch receiver 202 may be able to receive multiple touches simultaneously if, for example, the user selects multiple locations on the screen. The screen may detect touches using any technology known in the art including, but not limited to, resistive, capacitive, infrared, surface acoustic wave, strain gauge, optical imaging, acoustic pulse recognition, frustrated total internal reflection, and diffused laser imaging technologies.

In an embodiment, touch receiver 202 may receive two user inputs. For example, touch receiver 202 may sample inputs on the touch screen periodically. Touch receiver 202 may receive a first user input at a first sampling period, and may receive a second user input at a second sampling period. The first user input may indicate that an object have touched a view of the mobile device, and the second user input may indicate that the object has moved to a new position. The objects may be fingers but, in other embodiments, may be other objects, such as pens or other pointers. In this way, touch receiver 202 is able to receive touch gestures.

Gesture definition module 210 enables a user to define a touch gesture to initiate an associated action. In an embodiment, gesture definition module 210 may present an interface to define a touch gesture for an action. For example, gesture definition module 210 may present the user with a list of actions for which the user may define a gesture. The user may select an action from the list of actions. In response to the selection, gesture definition module may prompt the user for the touch gesture. The user may move her finger along the touch screen to input the gesture. Touch receiver 202 receives the input and forwards data specifying the input to gesture definition module 210. Finally, gesture definition module 210 stores data specifying at least the shape of the touch gesture into gesture database 212.

Gesture database 212 may store data specifying touch gestures for associated actions. Gesture database 212 may be any type of persistent memory including, for example, a SQL database.

Once a user defines a touch gesture, the user may input an analogous touch gesture to execute an analogous action. Touch receiver 202 may receive the analogous touch gesture on a touch screen of the mobile device. The analogous touch gesture is similar, but not identical, to the user-defined touch gesture, and has a different orientation, size or position on the touch screen of the mobile device from user-defined first touch gesture.

In response to receipt of the analogous touch gesture, gesture interpretation module 214 may initiate execution of an analogous action. Gesture interpretation module 214 may first determine the action to execute. The action is different from, but related to, the action that corresponds to the user-configured touch gesture. The action may be on the same application of the mobile device the user-configured touch gesture. The action may be determined according to a difference between the first and second touch gestures in orientation, size or position on the screen of the mobile device as illustrated with respect to FIG. 1.

Mobile applications 216 enable the mobile device to perform different functions. For example, the applications 216 may include a calendar application, an email application, or a media player application. In further examples, mobile device 202 may enable a user to download and install further applications 216 that add additional functionality to mobile device 202.

To detect the analogous touch gesture, gesture interpretation module 214 may compare the inputted touch gesture to the preconfigured gesture. In an example, gesture interpretation module 214 may normalize both the preconfigured gesture and the inputted gesture for variables such as size and position to compare them more easily. With variables such as size and position normalized, gesture interpretation module 214 may compare the shapes of the preconfigured gesture and the inputted gesture. Gesture interpretation module 214 may compare the shapes by, for example, using a feature detection algorithm to determine a similarity ratio. If the similarity ratio is below a certain threshold, then gesture interpretation module 214 may determine that the inputted touch gesture is analogous the preconfigured touch gesture. By comparing the inputted gesture to the preconfigured gesture, gesture database 212 need not store variations of preconfigured gesture.

In an alternative embodiment, when a user defines a new gesture, gesture definition module 210 may generate variations of preconfigured gesture that execute different actions.

Each of the gesture definition module 210, gesture interpretation module 214, and mobile applications modules 216 may be implemented in hardware, software, firmware, or any combination thereof.

Mobile device 200 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Figure 3:
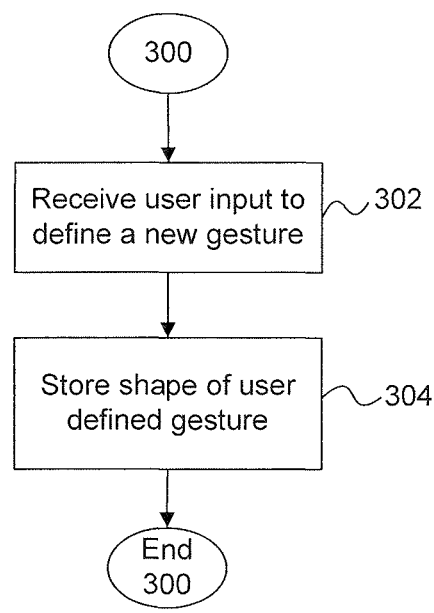
FIG. 3 is a flowchart illustrating a method for defining a touch gesture.

FIG. 3 is a flowchart illustrating a method 300 for defining a touch gesture. In an example, method 300 may be used in operation of gesture definition module 210 in FIG. 2.

Method 300 starts with receiving a user input to define a new gesture at step 302. In an embodiment, a mobile device may present an interface to a user that enables the user to define a gesture for a particular action. The user may input the gesture by moving her finger along the touch screen.

At step 304, the shape of the user-defined touch gesture is stored. In an embodiment, the shape may be stored in gesture database 212 in FIG. 2. With the shape stored in gesture database 212 in FIG. 2, the mobile device may be able to recognize similar shapes and, as result, execute similar actions.

Figure 4:
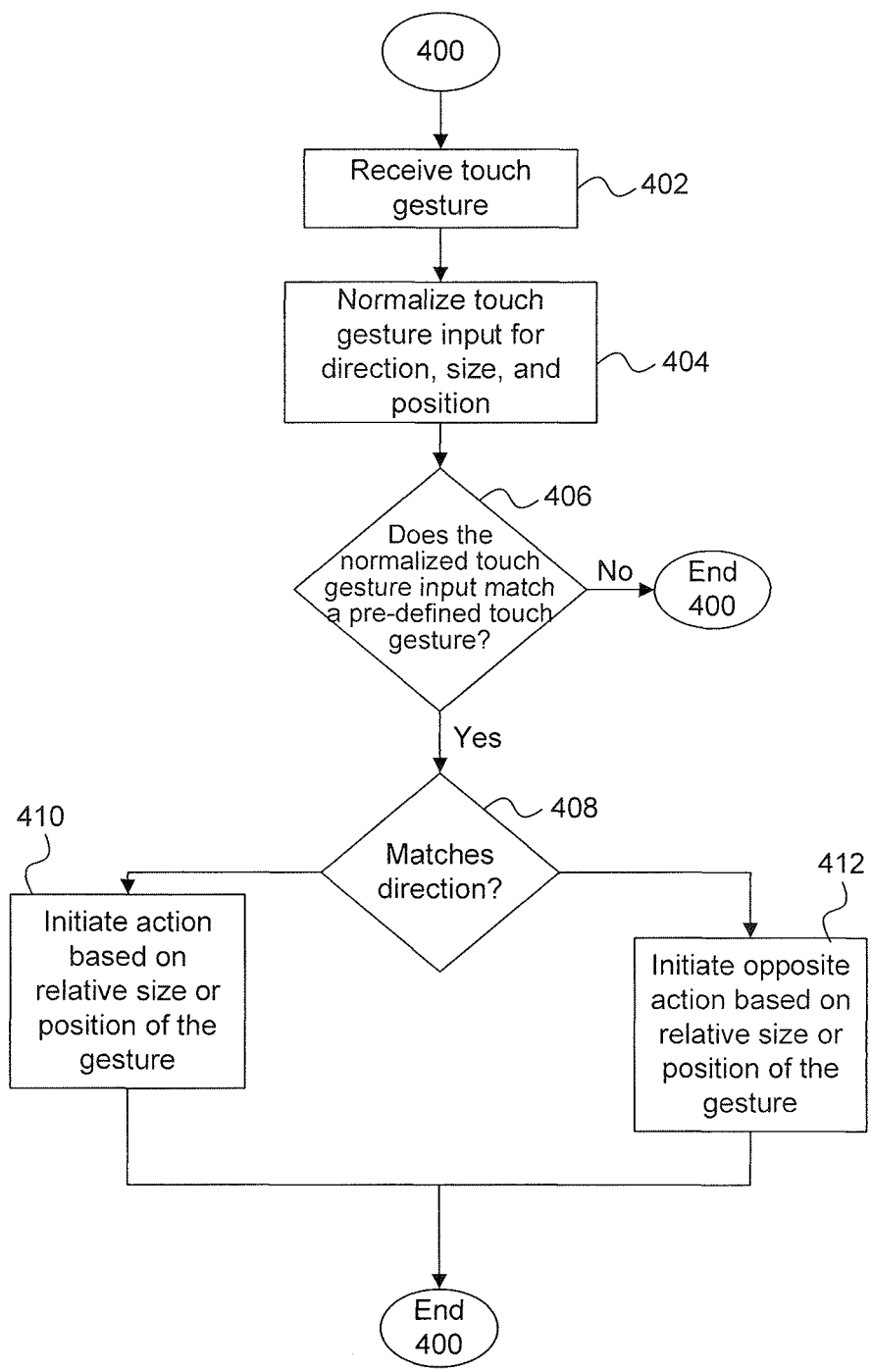
FIG. 4 is a diagram illustrating a method for automatically recognizing an analogous touch gesture to execute an analogous action, according to an embodiment.

FIG. 4 is a diagram illustrating a method 400 for automatically recognizing an analogous touch gesture to execute an analogous action according to an embodiment. Method 400 may, for example, be executed by gesture interpretation module 214 in FIG. 2.

Method 400 starts with receiving a touch gesture at step 402. An mentioned above, a touch receiver, such as touch receiver 202 in FIG. 2, may receive an input indicating that an object has touched a touch screen of the mobile device and moved to a new position on the mobile device's touch screen. In an example, the gesture may terminate with the user lifting his finger from the touch screen.

At step 404, the touch gesture input received in step 402 is normalized for variables, such as direction, size, and position. The touch gesture input may, for example, be a data structure that describes the path of the user's finger during the touch gesture. In an embodiment, the data structure may be normalized to make it easier to compare the inputted touch gesture to the user-defined touch gesture.

Once the touch gesture input is normalized, it is compared to the user-defined gestures stored at decision block 406. As mentioned above, the comparison may involve a feature detection algorithm to generate a similarity ratio. The touch gesture input may match the user-defined gesture if and only if the similarity ratio is above a threshold. If no user-defined gesture having a similar shape to the inputted gesture are found, then the method if terminate. If a match is found, execution proceeds to decision block 408.

At decision block 408, direction of the touch gesture input is compared with the user-defined gesture. If the direction of the touch gesture input matches the direction of the user-defined gesture, execution proceeds to step 410. If the direction of the touch gesture input is opposite of the direction of the user-defined gesture, execution proceeds to step 412.

At step 410, an action similar to the user-defined action is initiated based on a relative size or position of the gesture. Based on a size or position of the inputted gesture relative to a size or position of the user-defined gesture, a magnitude value may be determined. The action may be initiated, for example, using the magnitude value as a parameter input.

Similar to step 410, at step 412, an action opposite of the user-defined action is initiated based on a relative size or position of the gesture. In this way, a mobile device may initiate a wide variety of actions using a single user-defined gesture.

While several specific actions have been used in examples for illustrative purposes, a person of skill in the art that other analogous touch gestures may be used to initiate other actions as well. For example, analogous touch gestures may be used for making social network status updates, browsing through places or directories, interacting with media, such as pictures, music and videos, accepting voice input, browsing through a calendar, displaying different time periods (e.g., a day, a week, etc.) of a calendar, zooming in or out of a map, dialing different phone numbers, configuring alarms, browsing through web pages (e.g., moving back or forward or the larger the gesture, the further to navigate through the browser history), and selecting an application to execute.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
receiving, at a computing device, an indication of a first touch gesture;
associating the first touch gesture with a first action;
receiving, at the computing device, an indication of a second touch gesture;
determining, in response to determining that a shape of the second touch gesture corresponds to a shape of the first touch gesture, a difference in rotational orientation between the shape of the second touch gesture and the shape of the first touch gesture; and
initiating, in response to determining the difference in rotational orientation between the shape of the second touch gesture and the shape of the first touch gesture, a second action that varies from the first action based on the difference in rotational orientation.

2. The method of claim 1, wherein the difference in rotational orientation results in the first action being opposite to the second action.

3. The method of claim 2, wherein the shape of the second touch gesture has an opposite rotational orientation from the shape of the first touch gesture.

4. The method of claim 2, wherein the first action is to pause music playback and the second action is to resume music playback by an application of the computing device.

5. The method of claim 2, wherein the first action results in muting a speaker of the computing device and the second action results in unmuting the speaker.

6. The method of claim 2, wherein the first action is to skip ahead to a next track of media and the second action is to skip back to a previous track of media by an application of the computing device.

7. The method of claim 1, wherein determining the difference in rotational orientation between the shape of the second touch gesture and the shape of the first touch gesture comprises determining a magnitude that corresponds to the difference in rotational orientation.

8. The method of claim 1, wherein the first action changes the volume of the mobile device to a first level, wherein the second action changes the volume of the mobile device to a second level, and wherein a ratio of the first level to the second level corresponds to the difference in rotational orientation.

9. A system, comprising:
a memory configured to store data and computer-executable instructions;
a processor operatively coupled to the memory for executing the computer-executable instructions;
a touch receiver module configured to:
receive an indication of a first touch gesture; and
receive an indication of a second touch gesture;
a gesture definition module configured to associate the first touch gesture with a first action; and
a gesture interpretation module configured to:
determine, in response to determining that a shape of the second touch gesture corresponds to a shape of the first touch gesture, a difference in rotational orientation between the shape of the second touch gesture and the shape of the first touch gesture; and
initiate, in response to the determining the difference in rotational orientation between the shape of the second touch gesture and the shape of the first touch gesture, a second action that varies from the first action based on the difference in rotational orientation.

10. The system of claim 9, wherein the gesture interpretation module is further configured to determine that the difference in rotational orientation results in the first action being opposite to the second action.

11. The system of claim 10, wherein the gesture interpretation module is further configured to determine that the shape of the second touch gesture has an opposite rotational orientation from the shape of the first touch gesture.

12. The system of claim 10, wherein the first action is to pause music playback and the second action is to resume music playback by an application of the computing device.

13. The system of claim 10, wherein the first action results in muting a speaker of the computing device and the second action results in unmuting the speaker.

14. The system of claim 10, wherein the first action is to skip ahead to a next track of media and second action is to skip back to a previous track of media an application of the computing device.

15. The system of claim 9, wherein a gesture interpretation module is further configured to determine a magnitude that corresponds to the difference in rotational orientation.

16. The system of claim 9, wherein the first action changes a volume of the computing device to a first level, wherein the second action changes the volume of the computing device to a second level, and wherein a ratio of the first level to the second level corresponds to the difference in rotational orientation.

17. The system of claim 9, wherein the gesture interpretation module also determines the second action according to a difference in size between the first touch gesture and the second touch gesture.

* * * * *